United States Patent
Le Mer et al.

(10) Patent No.: US 8,919,001 B2
(45) Date of Patent: Dec. 30, 2014

(54) METHOD AND SYSTEM FOR HELPING TO POSITION A COMPONENT ON A STRUCTURAL ELEMENT

(75) Inventors: Erwan Le Mer, Saint-Nostang (FR); Yves Fretigny, Ploemeur (FR); Eric Le Scolan, Kervignac (FR)

(73) Assignee: DCNS, Paris (FR)

( * ) Notice: Subject to any disclaimer, the term of this patent is extended or adjusted under 35 U.S.C. 154(b) by 289 days.

(21) Appl. No.: 13/638,289

(22) PCT Filed: Apr. 1, 2011

(86) PCT No.: PCT/FR2011/050742
§ 371 (c)(1),
(2), (4) Date: Dec. 7, 2012

(87) PCT Pub. No.: WO2011/121256
PCT Pub. Date: Oct. 6, 2011

(65) Prior Publication Data
US 2013/0074350 A1 Mar. 28, 2013

(30) Foreign Application Priority Data

Apr. 2, 2010 (FR) .................................... 10 52534

(51) Int. Cl.
*G01B 11/27* (2006.01)
*G01B 11/14* (2006.01)
*B63B 9/00* (2006.01)
*G01C 15/00* (2006.01)
*G01C 15/02* (2006.01)

(52) U.S. Cl.
CPC . *G01B 11/14* (2013.01); *B63B 9/00* (2013.01); *G01C 15/00* (2013.01); *G01C 15/02* (2013.01)
USPC ......................................................... 33/286

(58) Field of Classification Search
USPC ............................................................ 33/286
See application file for complete search history.

(56) References Cited

U.S. PATENT DOCUMENTS

| | | | |
|---|---|---|---|
| 3,622,230 A * | 11/1971 | Dimmick | 33/25.1 |
| 5,646,859 A | 7/1997 | Petta et al. | |
| 5,651,600 A | 7/1997 | Dorsey-Palmatteer | |
| 6,170,163 B1 * | 1/2001 | Bordignon et al. | 33/16 |
| 6,594,600 B1 | 7/2003 | Arnoul et al. | |
| 7,165,332 B2 * | 1/2007 | McGrail et al. | 33/286 |
| 7,545,517 B2 | 6/2009 | Rueb et al. | |
| 7,621,053 B2 * | 11/2009 | Bianchin | 33/16 |
| 8,640,413 B2 * | 2/2014 | Ruggie et al. | 52/311.2 |
| 2007/0094878 A1 * | 5/2007 | Filep | 33/18.1 |
| 2014/0202013 A1 * | 7/2014 | Smith | 33/286 |

FOREIGN PATENT DOCUMENTS

FR 2 770 317 4/1999
WO WO2005/025199 3/2005

* cited by examiner

*Primary Examiner* — G. Bradley Bennett
(74) *Attorney, Agent, or Firm* — Davidson, Davidson & Kappel, LLC

(57) ABSTRACT

A method for helping to position a component on the wall of a structural element, including the steps:
elaborating an image to be projected on the wall, from a virtual model of the structure and from the positioning of a projector with respect to the structure, and an additional motif providing positioning information of the piece with respect to the direction normal to the wall,
projecting the image on the structural element by means of the projector;
placing the base of the piece inside an outline of the image projected on the wall; and,
while keeping contact between the piece and the structural element, modifying the positioning of the piece with respect to the direction normal to the wall, until the predefined set of points of the piece coincides with the motif.

6 Claims, 3 Drawing Sheets

METHOD AND SYSTEM FOR HELPING TO POSITION A COMPONENT ON A STRUCTURAL ELEMENT

The invention relates to a method and to a system for helping to position a piece on an element of a structure.

BACKGROUND

During the production of a structure, for example a surface ship or a submersible, after making or laying the main elements of the structure, such as the hull or the main subdivisions of the latter, a phase occurs for implanting various secondary pieces on the elements of the structure. The secondary pieces are for example ties, beds, structural parts or further pieces awaiting to be equipped, such as electrical pieces of equipment or equivalent. For a medium tonnage ship, such as a frigate, the matter is thus to position and attach about 50,000 pieces.

Presently, on the building site, an operator positions a piece on a structural element by means of a paper blueprint made in a design department, and then printed out. The dimensions indicated on this blueprint should be taken relatively to a local reference system of the structure also indicated on the blueprint. For each piece to be positioned, the operator should then identify, in position and in orientation, the local reference system. The operator then has to copy out, on the wall of the structural element, the dimensions indicating the suitable position and orientation with respect to the local reference system, of the surface of the piece, or base, bearing upon the structural element.

This conventional positioning method requires a substantial amount of time, not only for preparing the blueprints, but especially for using them on the site. Further, this method has the drawback of resorting to a local reference system. Further, under the particularly difficult conditions of a building site (congestion, shadowy light, etc.), the reading of the blueprints and the taking of measurements often carried out by hand are sources of errors on the exact positioning of the piece.

In order to optimize the positioning of the piece on the structural element prior to its attachment, the use of positioning aid systems was proposed, allowing the outline of the base imprint of the piece to be projected on the wall of the structural element used as a screen. The projection is made so that it accurately plots, in position and in orientation, the area for implanting the piece. Such a system, used in the building of aircraft, is disclosed by document WO2005/025199 A2.

The secondary pieces to be attached on the wall of a structural element of a ship are often ties for supporting a piece of equipment, the latter not being directly attached against the wall of the structural element. The tie is thus provided with connecting means intended to cooperate with conjugate connecting means provided on the piece of equipment to be supported.

A tie is generally a profile, the base of which substantially corresponds to a cross-section. That is to say that the tie is intended to be attached on the wall so that its longitudinal axis extends substantially parallel to the direction normal to the wall, at the implantation area. The means for connecting such a profiled tie are often located in the vicinity of the end of the tie, opposite to the base.

Now, as the tolerance margins on such secondary pieces are wide, it is possible that, although the base is properly positioned inside the outline projected on the wall of the structural element, the longitudinal axis of the tie is not properly oriented relatively to the direction normal to the wall. Accordingly, once the tie is attached, its connecting means do not have the required position and orientation, which may be a problem for cooperating with the conjugate connecting means of the piece of equipment to be supported.

The particular case of the positioning of a profiled tie, oriented substantially perpendicularly to the wall of the structural element, is illustrative and exacerbates the general problem of accurately spatially positioning a piece to be implanted on the wall of an element of a structure.

SUMMARY OF THE INVENTION

It is an object of the present invention to provide a method and a system for helping to position a piece on the wall of an element of a structure, in particular with which better spatial positioning of the piece may be obtained.

The present invention provides, in order to help an operator during the implantation of a piece on the wall of a structural element, that a suitable image is projected. This image contains geometrical data visually providing the operator with information which is necessary for him in order to properly position the piece before attaching it. This image includes data to be projected on different projection substrates. It includes a plot corresponding to the outline of the imprint, on the wall, of a supporting surface of the piece, said surface should come and face the wall. It also includes at least one additional motif such as a line segment corresponding to an edge or a predetermined generatrix of the piece, extending away from the supporting surface of the piece on the wall. The plot should be projected on the wall in order to provide a positioning datum of the base of the piece on the wall. The additional motif should be projected on the actual piece, in order to provide a datum for positioning the piece with respect to the direction normal to the wall.

BRIEF DESCRIPTION OF THE DRAWINGS

The invention and its advantages will be better understood upon reading the description which follows, only given as an example and made with reference to the appended drawings, wherein.

DETAILED DESCRIPTION

Figure 1:
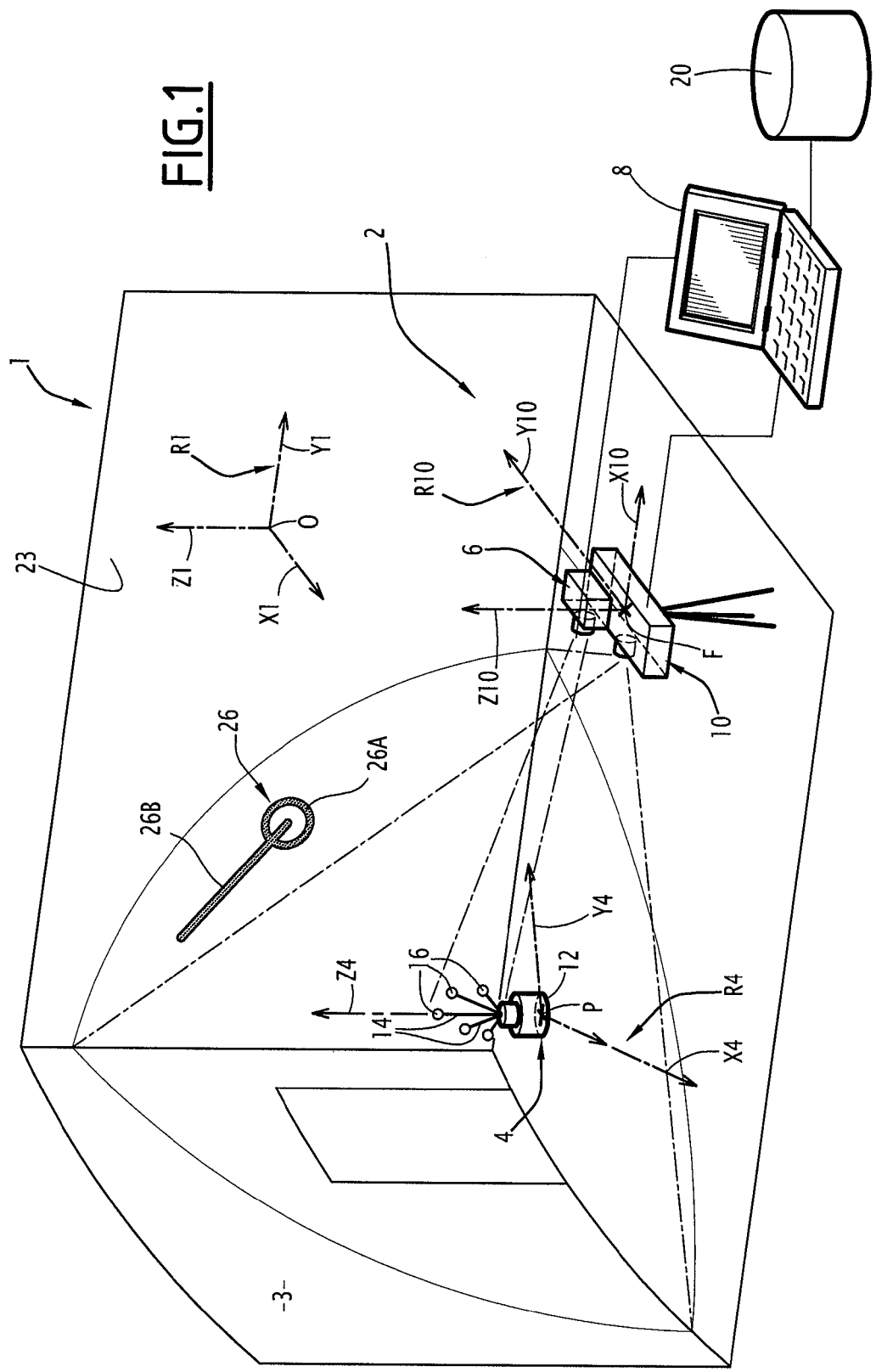
FIG. 1 is a schematic illustration of a system for helping to position a piece on the wall of a structural element, and FIGS. 2 to 4 schematically illustrate different steps of the method using the system of FIG. 1.

In FIG. 1, a mobile system 2 for helping to position a piece is deployed in premises 3 of a structure, being built, with the purpose of helping an operator to implant a piece 30 (illustrated in FIGS. 2 to 4) on the wall 23 of a partition of the premises as a structural element.

The system 2 includes a positioning marker 4, an infrared camera 6, a computer 8 and a projector 10.

All along the present document, by <<positioning>>, is meant the position and the orientation of a solid in a reference system.

The marker 4 is a three-dimensional test pattern. It includes a base 12 provided with several arms 14, of different length and orientation. The end of each arm 14 bears a sphere 16 capable of reflecting infrared light. The marker 4 defines a local reference system R4 consisting of a reference frame (X4, Y4, Z4) attached to a point P of the marker 4. The position and the orientation of the marker 4 relatively to the structure 1, i.e. with respect to an absolute reference system R1 consisting of a reference frame (X1, Y1, Z1) attached to a point O of the structure 1, are known by means of an initial calibration step. Alternatively, the marker 4 is formed by a set of reflecting discs positioned in the premises 3.

The camera 6 is secured to the projector 10. For example, it is attached on the projector 10 or integrated with the projector 10 for forming a single apparatus. The camera 6 is able to periodically emit an infrared light flash for illuminating the marker 4, and to simultaneously acquire an image of the marker 4, and to transmit the thereby acquired image to the computer 8 to which the camera 6 is connected.

The computer 8 notably includes, connected together, a processor, memory storage means, an input/output interface, as well as a synchronization clock. The computer 8 is connected through its input/output interface both to the camera 6 and to the projector 10. The processor of the computer 8 is able to execute instructions of computer programs stored in its memory storage means. In particular, the computer 8 includes an operating system constituting an operating environment for to different application software modules.

Among these application software modules, the computer 8 includes a software module for recognizing the shape and the positioning of the marker, which, when it is executed by computer 8, is able to analyze the image transmitted by the camera 6 so as to recognize the shape of the marker 4 thereon. Next, from the recognized shape, the recognition module is able to infer therefrom the positioning of the camera 6 with respect to the marker 4.

Indeed, the image of the marker 4 depends on the position of the camera 6 relatively to the marker 4. Thus, from the image of the marker 4 acquired by the camera 6, it is possible to determine the positioning of the camera 6 relatively to the marker 4. One skilled in the art knows how to produce adapted software packages for carrying out such image processing.

Thus, the positioning calculated at the output of the module for recognizing the shape and positioning of the marker corresponds to the position and to the orientation of the camera 6 in the local reference system R4.

As the camera 6 is attached to the projector 10, the positioning of the projector 10 in the local reference system R4 is inferred from the positioning of the camera 6 in the local reference system R4 by a predefined translation and rotation.

The relative positioning of the projector 10 is characterized by three space position coordinates of a point F of the projector 10, as well as by three orientation coordinates of a reference frame R10, (X10, Y10, Z10) associated with point F. Preferably, the point F is the focus point of the optical system of the projector 10 and the axis X10 is the optical axis of this optical system.

The computer 8 also includes a database as well as a software module for elaborating a virtual model of the structure.

As this is well known to one skilled in the art who knows how to build it, the database, schematically illustrated in FIG. 1 and bearing reference 20, includes a plurality of objects which each correspond to an object of the structure 1, whether these are structural elements or pieces to be implanted. In the database 20, each object is associated with a plurality of attributes with which it may be described. In particular, certain attributes give the possibility of geometrically defining all or piece of the shape of the corresponding object and of giving its positioning relatively to the absolute reference system R1.

Thus, the database inter alia includes attributes defining the shape and the absolute positioning of the base 32 of the piece 30 to be implanted, as well as the absolute positioning of a generatrix A' of the piece 30, and of a particular point 34 of this generatrix.

The elaboration module includes a man/machine interface which provides the operator with the possibility of selecting a set of objects of interest, such as the piece to be attached and the structural element on which this particular piece has to be implanted.

On the basis of the attributes of the selected objects, a virtual three-dimensional illustration of the structure 1, also designated as a model or virtual model, is constructed by the elaboration module executed by the computer 8.

Finally, the computer 8 includes a software perspective module which, when it is executed, generates a virtual image corresponding to the observation of the model from a point of view and under an angle of observation which coincides with the position of the focus F and the orientation of the optical axis of the projector 10 with respect to the structure 1. The software perspective module uses the model, given by the elaboration model, and the positioning of the projector 10 in the local reference system R4, given by the shape and positioning recognition module. It notably transforms the information on the positioning of the projector 10 in the local reference system R4, into information on the positioning of the projector 10 in the absolute reference system R1, by using the positioning of the marker 4 in the absolute reference system R1 from the calibration.

The processing operation with which such an image may be generated is known to one skilled in the art and consists of projecting each point of the model, along a radius of the projection cone having as an apex the optical center F of the projector 10, on a plane orthogonal to the optical projection axis 10. The thereby obtained image in this plane forms, after an optional scaling step, the virtual image to be projected.

The virtual image is transmitted from the computer 8 to the projector 10. The latter projects an image 26 on the wall 23.

The image 26 includes the outline 26A of the imprint on wall 23 of the base 32 of the piece 30, as well as a line segment 26B, one first end 26C of which is located inside this outline.

When the piece 30 is properly positioned in space, the line segment 26B is superposed to the generatrix A' of the piece 30 and the second end 26D of the line segment 26B coincides with the particular point 34 of the generatrix A'.

It will be noted that the projector 10 may be of the type allowing projection of a color image. The use of such a projector enables the display of a large number of pieces simultaneously and provides the possibility of giving additional information to the operator. Further, such projectors, even the most simple available on the market, have a very open projection cone, which may be particularly appreciated on a ship-building site where the available distance for projecting an image may be reduced.

The projector 10 may be of the laser type, able to project a laser spot on a projection substrate. By exploiting the retinal persistence property, laser spot is run along the perimeter of the image to be projected, with high frequency.

Referring back to FIGS. 2 to 4, the implantation aid method will now be described for the case of a tubular piece 30 with a longitudinal axis A. The piece 30 has a base 32 forming a ring-shaped disc, intended to bear upon the wall 23.

Figure 2:
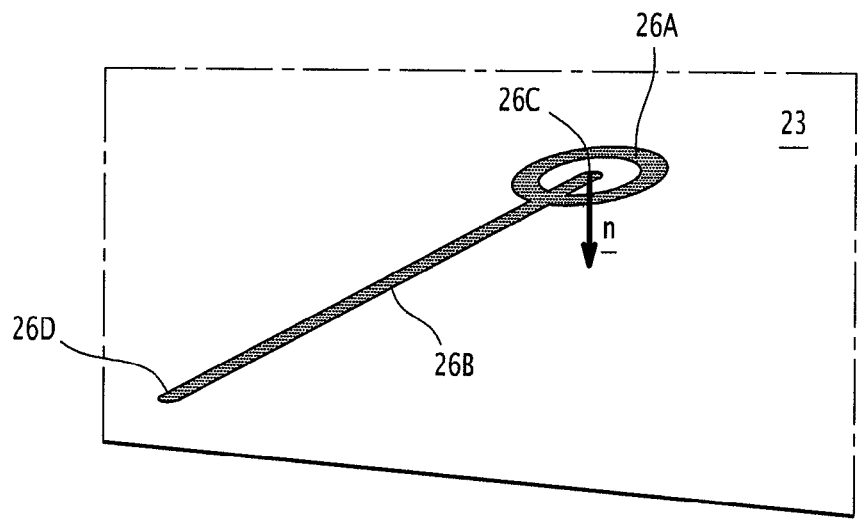

In FIG. 2, as this has been shown above, the projected image 26 on the wall 23 includes a outline 26A delimiting the implantation area, and a line segment 26B.

The outline 26A of the image 26 has the function of designating the implantation on the wall 23. It is therefore projected on the wall 23 without any distortions. The outline 26A which corresponds to the base 32 of the piece 30 thus has the shape of a ring-shaped disc, the dimensions of which are adjusted to those of the base 32 of the piece 30.

On the other hand the line segment 26B of the image 26 which has the function of designating a generatrix A' of the piece 30 is not properly projected on the wall 23. The second end 26D of the line segment 26B is, therefore projected on the wall 23, at a distance from the outline 26A.

Figure 3:
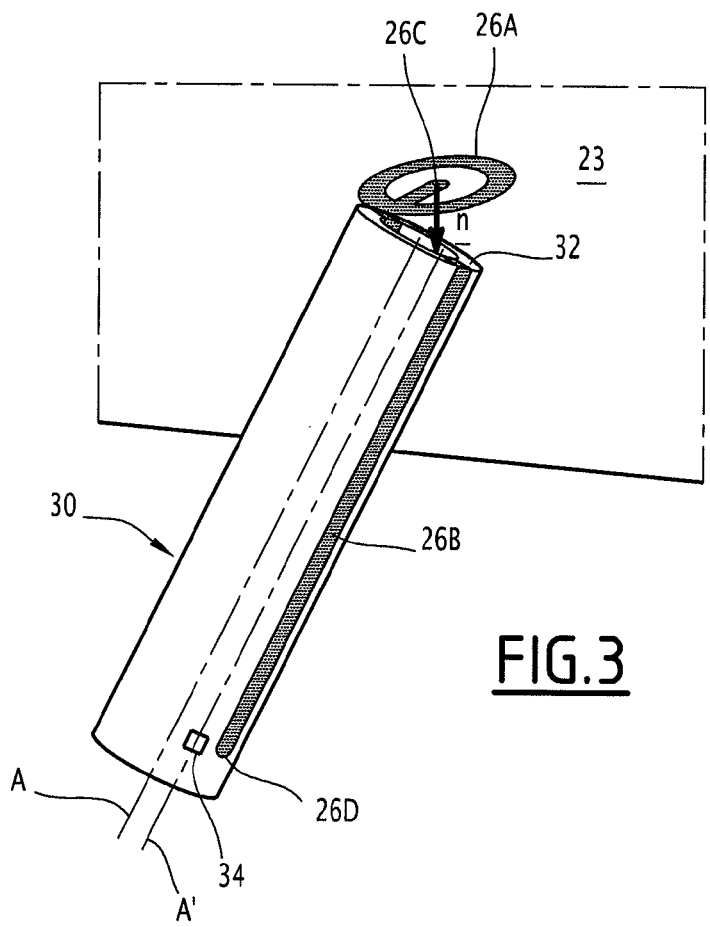
Figure 4:
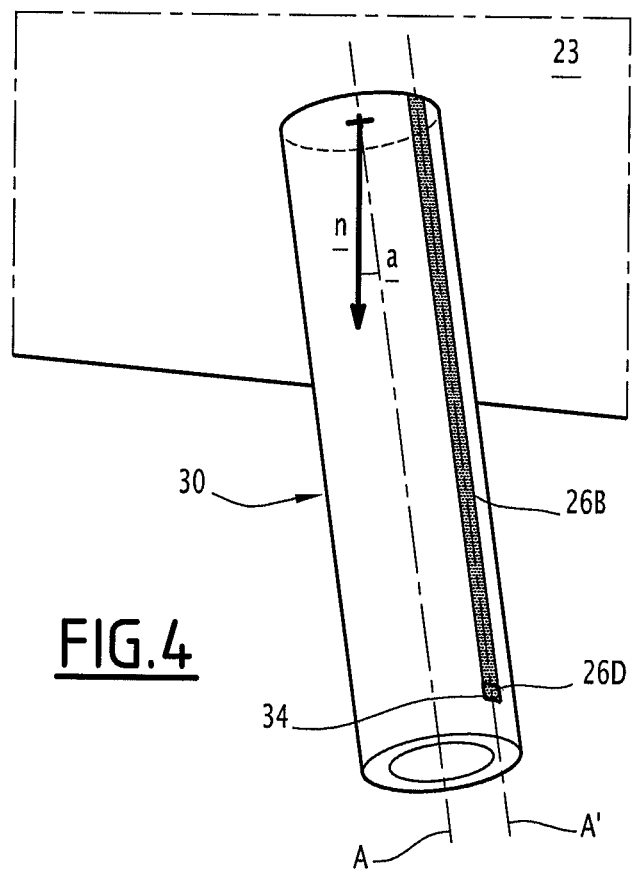

In FIG. 3, the operator moves closer the piece 30 and positions the base 32 on the implantation area, inside the outline 26A.

Next, while keeping at least one contact point between the base 32 and the wall 23, the operator modifies the orientation of the longitudinal axis A of the piece 30 in order to have the line segment 26B coincide with the generatrix A' of the piece 30. Advantageously and for more accurate positioning, the operator tries to have the second end 26D of the segment 26B coincide with the particular point 34 of the generatrix A' (FIG. 3).

When either one and/or both of these coincidences is obtained, this means that the piece 30 is properly positioned, both according to the wall of the structural element and according to the direction normal to this wall. In particular, the direction of the axis A of the piece 30 forms a predetermined angle a with the normal direction n to the wall 23.

During this step, the piece 30 forms the projection substrate for the portion of the image corresponding to the line segment 26B. It is only when the piece 30 is properly positioned spatially that the line segment 26B is projected on the piece 30 without any distortions.

It should be noted that this imposes that the projector 10 be initially positioned so as to allow projection of the image both on the wall and on the piece positioned on the wall.

It should also be noted that there may subsist an ambiguity on the orientation of the piece with respect to the wall, since the particular point and the predefined point of the piece may in certain cases coincide with each other for several positions of the piece in a projection plane which is defined by the projection cone of the line segment from the projector. Advantageously, a visual foolproofing code is integrated to the projected image in order to tell the operator the position which must be selected from the different possible positions.

Finally, while keeping the proper positioning of the piece 30 which has just been found, the operator proceeds with attaching the piece 30 onto the wall 23.

The preceding example illustrates the case when the datum to be projected on the piece provides the orientation of the piece with respect to the normal direction of the structural element in the vicinity of the implantation area. The method may also be applied for adjusting for example the screwing depth of the piece on a structural element including a tapped threading. The datum to be projected on the piece then provides the dimension or the height of a predetermined point of the piece with respect to the structural element, the datum to be projected on the structural element for example plotting the location for tapping a threading in order to receive the piece.

More generally, one skilled in the art will notice that the projected image includes geometrical data which has to be read on different projection substrates: the structural element and the piece to be implanted itself. The datum projected on the structural element provides the positioning of the piece base along the surface of the structural element, while the datum projected on the piece, away from the base, provides the positioning of the piece with respect to the direction normal to the surface of the structural element.

What is claimed is:

1. A method for helping to position a piece on a wall of an element of a structure, the method comprising the following steps:
    elaborating an image intended to be projected on the wall of the structural element using a projector from a virtual model of the structure and from a position and an orientation of the projector with respect to the structure, the image including an outline delimiting an area for implanting the piece on the wall of the element of the structure, the wall of the element of the structure being used as a projection substrate for said outline, and at least one additional motif providing positioning information of the piece with respect to a direction normal to the wall of the element of the structure, said additional motif corresponding to a predefined set of points of the piece, said piece being used as a projection substrate for the at least one additional motif;
    projecting the elaborated image on the element of the structure;
    placing a surface of the piece which should come and face the wall, inside the outline projected on the element of the structure; and
    while keeping contact between the piece and the element, modifying the positioning of the piece with respect to the direction normal to the wall of the element, until said predefined set of points of the piece coincides with said additional motif.

2. The method as recited in claim 1 wherein said additional motif is a line segment limited by a first end located inside said outline and a second end located away from said outline.

3. The method as recited in claim 2 wherein the second end of the line segment and a predefined point of said set of points of the piece coincide.

4. The method as recited in claim 2 wherein the line segment corresponds to a generatrix or an edge of said piece.

5. A system for helping to position a piece on the wall of an element of a structure, the system comprising:
    a projector;
    a localizer able to determine a position of the projector with respect to the structure;
    a computer connected to the localizer and to the projector and including:
        a module for controlling the projector,
        a database including a detailed description of constitutive objects of the structure,
        a module for elaborating a virtual model of all or piece of the structure, and
        a perspective module capable, from the position of the projector with respect to the structure and from the virtual model, of generating an image intended to be projected on the wall of the element of the structure using the projector, said image including a outline delimiting an area for implanting a piece on the wall of the element of the structure, the wall of the element being used as a projection substrate for said outline, and at least one additional motif providing positioning information of the piece with respect to a direction normal to the wall of the element of the structure, said additional motif corresponding to a predefined set of points of the piece, said piece being used as a projection substrate for the at least one additional motif.

6. The system as recited in claim 5 wherein the localizer includes:
    a test pattern located in a predefined position and with a predefined orientation with respect to the structure;
    a camera, a positioning of the camera, with respect to the projector, being known and the camera able to acquire at least one image of the test pattern; and
    an image processing module, executed by the computer, the camera being connected to the computer, and the image processing module able to determine, from the image of the test pattern, the position of the camera with respect to the structure and therefore the position of the projector relative to the structure.

* * * * *